April 4, 1961 R. L. PEEK, JR 2,978,670

COMPRESSIONAL WAVE TRANSLATING DEVICE

Filed Feb. 22, 1943

INVENTOR
R. L. PEEK, JR.

BY

Walter C. Kiesel

ATTORNEY 2,978,670
Patented Apr. 4, 1961

2,978,670

COMPRESSIONAL WAVE TRANSLATING DEVICE

Robert Lee Peek, Jr., Short Hills, N.J., assignor to Bell Telephone Laboratories, Incorporated, New York, N.Y., a corporation of New York Filed Feb. 22, 1943, Ser. No. 476,726

9 Claims. (Cl. 340—11)

This invention relates to compressional wave translating devices and more particularly to supersonic submarine signaling devices of the magnetostrictive type.

One object of this invention is to improve the sensitivity and efficiency of magnetostrictive signal translating devices.

Another object of this invention is to simplify the construction of supersonic, magnetostrictive submarine signaling devices.

In one illustrative embodiment of this invention, a hydrophone comprises a base or support member adapted to be exposed to sea water and capable of efficiently transmitting supersonic compressional wave energy, a magnetostrictive element coupled to the base or support member and in energy communicating relation therewith, means for polarizing the magnetostrictive element longitudinally, and a signal coil electromagnetically coupled to the magnetostrictive element. Vibration of the magnetostrictive element in accordance with energy conveyed thereto through the base or support results in variation in the flux linked by the coil and the generation, consequently, of a signal voltage in the coil. Conversely, when the coil is energized by suitable signal currents, the magnetostrictive element elongates and contracts accordingly and drives the base or support to propagate compressional waves corresponding to the signals.

In accordance with one feature of this invention, the magnetostrictive element is in the form of a thin hollow member, for example, cylindrical, is polarized by a permanent magnet within the member and having its ends or associated pole-pieces in juxtaposition to spaced portions thereof, and means are provided which in conjunction with the magnetostrictive element define a low reluctance path, separate from the magnet, for the varying or signal flux.

In accordance with another feature of this invention, the base or support and the magnetostrictive element are so constructed and arranged that a vibrational node exists adjacent the junction thereof, the signal coil is mounted adjacent this junction and the magnet, magnetostrictive element and the means defining the low reluctance path with the element are correlated to maintain a uniform high flux density within the magnetostrictive element adjacent the node, so that the flux density in the region of the node may be maintained at a value providing optimum magnetostrictive action.

Figure 2:
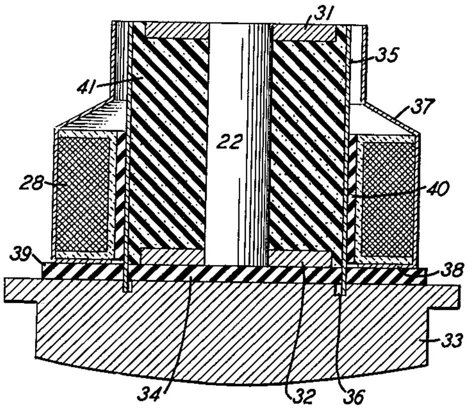
Figure 1:
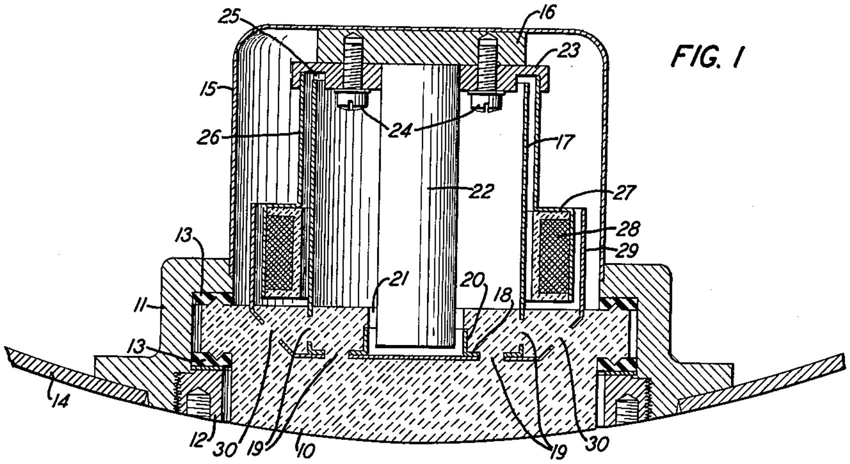

The invention and the above noted and other features thereof will be understood more clearly and fully from the following detailed description with reference to the accompanying drawing in which:

Fig. 1 is an elevational view in section of a hydrophone illustrative of one embodiment of this invention; and Fig. 2 is another elevational view in section of a modification of the hydrophone shown in Fig. 1.

Referring now to the drawing, the hydrophone illustrated in Fig. 1, which is suitable for use as a projector or receiver at supersonic frequencies, for example frequencies of the order of 25 kilocycles per second, comprises a circular base or support 10 of a moldable insulating material or plastic. This base or support is clamped to an annular mounting frame 11 by a suitable clamping ring 12, gaskets 13, for example of soft rubber, being provided between the base or support 10 and the frame 11 and clamping ring 12 to assure a water-tight seal therebetween. The frame 11 is affixed, as by welding, in water-tight relation to a housing 14 adapted to be submerged in the sea. Secured to the mounting frame 11 is a cup-shaped housing 15, for example of non-magnetic metal, which has affixed to the base thereof a non-magnetic plate 16.

Coaxially arranged with the base or support 10 is a magnetostrictive member 17, for example, of a nickel-iron alloy known commercially as "Permalloy," having a bent end portion 18 embedded in the base or support and provided with apertures 19 to allow flow of the base or support material around the end portion. The end portion 18 terminates in a cylindrical lip or flange 20 which constitutes a portion of the bounding wall of a central recess 21 in the support or base 10. A bar magnet 22, for example of circular cross-section, extends into the recess 21 in juxtaposition to and coaxial relation with the lip or flange 20 and is supported by an annular pole piece 23 of a material having high permeability secured to the non-magnetic plate 16 as by screws 24, the pole-piece 23 having therein an annular recess 25 into which the magnetostrictive member 17 projects.

The magnetostrictive member 17 is encompassed by a tubular member 26 coaxial with the member 17 and of a magnetic material having a high permeability. The tubular member 26 has a portion 27 of larger diameter in which an annular signal coil 28 is fitted and secured, and is supported from the pole-piece 23. The enlarged portion 27 of the tubular member is encompassed by a dish-shaped magnetic member 29 of a material of high permeability, a portion of which is embedded in the support or base 10 and provided with apertures 30 allowing flow of the support or base material therethrough during the fabrication of the device. As shown in the drawing, the base of the dish-shaped member 29 is in firm contact with the base of the end portion 18 of the magnetostrictive element 17.

Advantageously, the base or support 10 and the magnetostrictive member 17 are made of such thickness and length respectively, account being taken, of course, of their relative cross sectional dimensions, densities and moduli of elasticity, that the base 10 and member 17 vibrate longitudinally as a half wave length resonator, at a preassigned frequency, with a vibrational node in the element 17 adjacent the junction thereof and the base or support 10. Of course, because of the different materials of which the base and cylinder are constructed, the absolute magnitude of the dimensions noted will be different. In the case where the device is intended for operation at a single frequency, the dimensions noted are related to this frequency. Where the device is intended for operation throughout a band of frequencies, the preassigned frequency is the mean frequency in this band.

In the operation of the hydrophone, the magnetostrictive element 17 is polarized longitudinally by the permanent magnet 22. A direct current flux is established also in the path including the magnet 22, pole piece 23, tubular member 26 and dish-shaped member 29. When compressional waves impinge upon the outer face of the base 10, the magnetostrictive element 17 is actuated and as a result of the varying stresses produced therein its reluctance varies accordingly and the flux therethrough varies in like manner. The varying component of flux flows in the main through the path composed of the magnetostrictive element 17, tubular member 26 and dish-shaped member 29. The air gaps in this path are of very small length and large area so that the reluctance thereof is small. Also, because of the high permeability of the magnetic members in this path, the reluctance thereof is small. Hence, it will be appreciated that there is provided a magnetic loop, separate from the magnet 22 and of very low reluctance, for the varying flux and a path of high magnetic efficiency for the flux linked by the signal coil 28 is realized. The eddy current losses in this path are low. Furthermore, because of the relation of the magnet 22 and the lip 20, a high direct current flux concentration is assured at the gap therebetween and substantially all the direct current flux passes to the member 17 by way of the end portion 18 so that a uniform flux density is established in the portion of member 17 near the base 10, at which the major stress variations occur. Moreover, because of the relation of the thickness of the base 10 and the length of the magnetostrictive cylinder to the wave-length of the signals received, noted heretofore, a node of vibration is established adjacent the junction of these two members. This results in the concentration of the greatest stress variations in the portion of the magnetostrictive element immediately adjacent the signal coil 28 and, consequently, in the greatest magnetostrictive action in the portion of the varying flux path most closely linked by the coil.

Although the operation of the device has been described with particular reference to reception of compressional wave energy, it will be understood that, as noted heretofore, the device is operable also as a projector and that the several meritorious features pointed out hereinabove are realized also when the device is operated as a projector. When the device operates as a projector, signal currents in the coil 28 result in longitudinal vibration of the cylinder 17 which is communicated to the base 10.

Inasmuch as the base or support 10 is exposed directly to the sea, problems of obtaining an impedance match between the sea and the magnetostrictive element are minimized. Further, inasmuch as the magnetostrictive element is supported solely by the base or support and the latter is of lightweight material, a vibrating system of small weight is obtained so that high sensitivity is realized. Further, because of the small weight noted, the device shown and described is especially suitable for wide band usage.

The embodiment of this invention illustrated in Fig. 2 is generally similar to that shown in Fig. 1 and described hereinabove. It comprises the magnet 22, which is provided with annular pole-pieces 31 and 32 and is supported upon the base or support 33, which may be of magnetic material, by way of an interposed pad 34 of resilient material, such as soft rubber. The magnet and pole-pieces are encompassed by a magnetostrictive cylinder 35, for example, of Permalloy, one end of which is secured in an annular groove 36 in the base or support 33. The magnetostrictive cylinder 35 is encompassed in turn by a tubular magnetic member 37 of high permeability having an inwardly projecting annular flange 38 terminating adjacent the cylinder 35 and secured to a resilient pad 39 in turn secured to the base or support 33. The signal coil 28 encompasses the magnetostrictive cylinder 35 and may be spaced therefrom by a resilient, e.g. soft rubber sleeve 40. The magnet 22 also may be spaced from the magnetostrictive cylinder by a resilient, e.g. soft rubber body 41.

As in the device shown in Fig. 1, the base or support 33 and magnetostrictive cylinder 35 advantageously have their thickness and length respectively related to a preassigned frequency so that the base and cylinder together vibrate as a half wave resonator with a node adjacent the junction of the base and cylinder. The hydrophone shown in Fig. 2 operates in the same manner, as a receiver or projector, as that illustrated in Fig. 1. Because the magnet 22, tubular member 37, 38 and coil 28 are mounted resiliently upon the base or support 33, vibration of these members is negligibly small. The magnetostrictive cylinder 35, however, being fixedly secured to the base or support 33, vibrates in response to compressional waves incident upon the base or support. Conversely, longitudinal vibrations of the cylinder 35 in response to signal currents in the coil 28 drive the base or support 33.

Although specific embodiments of the invention have been shown and described, it will be understood that they are but illustrative and that various modifications may be made therein without departing from the scope and spirit of this invention as defined in the appended claims. For example, although the base 33 in Fig. 2 has been described as of magnetic material, it may be of a plastic, as in Fig. 1, and have imbedded therein a magnetic element linking the flange 38 to the magnetostrictive cylinder 35.

What is claimed is:

1. A compressional wave translating device comprising a tubular magnetostrictive member, means mounting said member to allow longitudinal vibration thereof, means for polarizing said member longitudinally including a permanent magnet within said member, a signal coil electromagnetically coupled to said member, and means defining with said member a low reluctance magnetic circuit separate from said magnet, said last means comprising a tubular magnetic member of high permeability encompassing said magnetostrictive member and mechanically separate therefrom.

2. A compressional wave translating device comprising a tubular magnetostrictive member, means mounting said member for longitudinal vibration, means for polarizing said member longitudinally including a permanent magnet encompassed by said member, means defining with said member a low reluctance magnetic circuit separate from said magnet, said last means comprising a tubular member of low reluctance magnetic material encompassing said magnetostrictive member, said tubular member having a portion of extended area immediately adjacent said magnetostrictive member and having also a portion of greater diameter than said first portion, and a signal coil encompassing said magnetostrictive member and positioned within said portion of greater diameter, said magnetostrictive member being vibratile independently of said tubular member.

3. A compressional wave translating device comprising a tubular magnetostrictive member, a wave energy responsive support secured to said member at one end thereof, means for polarizing said member longitudinally including a permanent magnet within said member, having its poles opposite the ends thereof and spaced therefrom and from said support, a signal coil encompassing said member near said one end thereof, and tubular magnetic means encompassing said magnetostrictive member and having end portions adjacent spaced portions thereof.

4. A compressional wave translating device comprising a tubular magnetostrictive member having one end substantially freely vibratile and its other end joined to a compressional wave transmitting member, means for polarizing said magnetostrictive member longitudinally including a magnet encompassed by said magnetostrictive member, magnetic means at opposite ends of said magnetostrictive member extending between said magnet and said magnetostrictive member, tubular magnetic means of low reluctance encompassing said magnetostrictive member and having end portions in proximity to the ends thereof, and a signal coil magnetically linked to said magnetostrictive member.

5. A compressional wave translating device comprising a support adapted to transmit compressional wave energy, a tubular magnetostrictive member having one end fixed to said support and its other end free, a magnet within said member and spaced from said support, a pole-piece extending from one pole of said magnet into proximity to the free end of said member, said member having an extension projecting into proximity to the other pole of said magnet, a tubular, low reluctance magnetic member encompassing said magnetostrictive member and having a portion of extended area in proximity to the free end portion thereof, means defining a low reluctance magnetic connection between said tubular member and the fixed end of said magnetostrictive member, and a signal coil magnetically coupled to said magnetostrictive member.

6. A compressional wave translating device comprising a tubular magnetostrictive member having an inwardly extending flange at one end thereof, means supporting said member at said one end thereof, means for polarizing said member longitudinally including a magnet within said member and having one end in proximity to said flange, a pole-piece mounted at the other end of said magnet and extending into proximity to the other end of said magnetostrictive member, means defining with said member a low reluctance magnetic circuit separate from said magnet, said last means including a magnetic member encompassing said magnetostrictive member having a sleeve portion of extended area in juxtaposition to the end portion of said magnetostrictive member nearest said pole-piece and having also a tubular portion of greater diameter than said sleeve portion adjacent said supporting means, said circuit defining means including also a magnetic member engaging said flange and having a tubular portion coaxial with and in juxtaposition to said first tubular portion, and a signal coil encompassing said magnetostrictive member and supported within said first tubular portion.

7. A compressional wave translating device comprising a support adapted to transmit compressional wave energy, a tubular magnetostrictive member having one end connected to said support, means for polarizing said member longitudinally including a magnet encompassed by said member and resiliently mounted on said support, a signal coil magnetically coupled to said magnetostrictive member, and means defining with said magnetostrictive member a low reluctance magnetic circuit separate from said magnet, said last means comprising a tubular member encompassing said magnetostrictive member and resiliently mounted on said support.

8. A compressional wave translating device comprising a support capable of transmitting compressional wave energy, a tubular magnetostrictive member having one end fixed to said support, means for polarizing said magnetostrictive member longitudinally including a permanent magnet within said member, means defining with said member a low reluctance magnetic circuit separate from said magnet, said second means comprising a magnetic shell having an annular flange encompassing and adjacent one end of said member and having also a tubular portion encompassing and adjacent the other end of said member, a signal coil magnetically coupled to said member, and means mounting said magnet and shell resiliently on said support.

9. A compressional wave translating device comprising a base adapted to transmit compressional wave energy, a cylindrical magnetostrictive member having one end fixed to said base and its other end free, said base member being of predetermined thickness and length respectively such that said base and member vibrate together as a half wave length resonator with a node in said member adjacent the junction thereof and said base, means for polarizing said member longitudinally including a magnet within said member, a signal coil adjacent said base and encompassing said member, and means defining with said member a low reluctance magnetic circuit separate from said magnet, said last means including tubular magnetic means encompassing said member, having a portion in proximity to said one end thereof and having also a portion of extended area immediately adjacent the portion of said member near said free end thereof.

References Cited in the file of this patent

UNITED STATES PATENTS

| | | |
|---|---|---|
| 1,966,446 | Hayes | July 17, 1934 |
| 2,059,107 | Hinton | Oct. 27, 1936 |
| 2,153,571 | Kallmeyer | Apr. 11, 1939 |
| 2,170,206 | Mason | Aug. 22, 1939 |
| 2,249,835 | Lakatos | July 22, 1941 |

FOREIGN PATENTS

| | | |
|---|---|---|
| 770,430 | France | Sept. 13, 1934 |
| 422,259 | Great Britain | Jan. 8, 1935 |
| 832,891 | France | Oct. 4, 1938 |